(12) United States Patent
Nakagoshi

(10) Patent No.: US 12,022,242 B2
(45) Date of Patent: Jun. 25, 2024

(54) DISPLAY SYSTEM AND DISPLAY METHOD USING IMAGING APPARATUS AND PROJECTION VIDEO DISPLAY APPARATUS

(71) Applicant: JVCKENWOOD Corporation, Yokohama (JP)

(72) Inventor: Ryosuke Nakagoshi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 176 days.

(21) Appl. No.: 17/686,551

(22) Filed: Mar. 4, 2022

(65) Prior Publication Data

US 2022/0191444 A1  Jun. 16, 2022

Related U.S. Application Data

(63) Continuation of application No. PCT/JP2020/033108, filed on Sep. 1, 2020.

(30) Foreign Application Priority Data

Sep. 4, 2019  (JP) .................. 2019-161110

(51) Int. Cl.
| | | |
|---|---|---|
| H04N 9/31 | (2006.01) | |
| H04N 7/18 | (2006.01) | |
| H04N 9/47 | (2006.01) | |
| H04N 23/84 | (2023.01) | |
| H04N 25/48 | (2023.01) | |

(52) U.S. Cl.
CPC ........... *H04N 9/3188* (2013.01); *H04N 7/183* (2013.01); *H04N 9/47* (2013.01); *H04N 23/84* (2023.01); *H04N 25/48* (2023.01)

(58) Field of Classification Search
CPC ...... H04N 9/3188; H04N 25/48; H04N 23/84; H04N 7/183; H04N 9/47
USPC .......................................... 348/294
See application file for complete search history.

(56) References Cited

U.S. PATENT DOCUMENTS

| | | | |
|---|---|---|---|
| 2008/0284763 A1 | 11/2008 | Someya et al. | |
| 2010/0182482 A1 | 7/2010 | Tanaka et al. | |

FOREIGN PATENT DOCUMENTS

| | | |
|---|---|---|
| CN | 1313981 A | 9/2001 |
| CN | 1868217 A | 11/2006 |
| CN | 101547328 A | 9/2009 |
| CN | 102804756 A | 11/2012 |
| CN | 103139517 A | 6/2013 |
| CN | 106507075 A | 3/2017 |
| CN | 109070824 A | 12/2018 |

(Continued)

OTHER PUBLICATIONS

International Search Report for the corresponding PCT Application No. PCT/JP2020/033108 with English translation dated Nov. 24, 2020, 4 pages.

(Continued)

*Primary Examiner* — Joel W Fosselman
(74) *Attorney, Agent, or Firm* — Shih IP Law Group, PLLC

(57) ABSTRACT

In a display system, an imaging apparatus takes a video by shifting pixels in units of frames by moving a solid state image sensing device or an optical member physically. A projection video display apparatus acquires a video taken by the imaging apparatus, optically performs pixel shift corresponding to pixel shift performed in the imaging apparatus at the time of imaging, and projects the video acquired.

12 Claims, 7 Drawing Sheets

(56) References Cited

FOREIGN PATENT DOCUMENTS

| | | |
|---|---|---|
| JP | S61-251819 | 11/1986 |
| JP | H07-274070 A | 10/1995 |
| JP | 2003-502687 A | 1/2003 |
| JP | 2003179940 * | 6/2003 |
| JP | 2003179940 A | 6/2003 |
| JP | 2006058588 A | 3/2006 |
| JP | 2013247458 A | 12/2013 |
| JP | 2014110584 A | 6/2014 |
| JP | 2017223718 A | 12/2017 |
| WO | 2017/031246 A1 | 2/2017 |

OTHER PUBLICATIONS

International Preliminary Examination Report on Patentability (I) from International Application No. PCT/JP2020/033108 dated Mar. 8, 2022, 11 pages.

\* cited by examiner

DISPLAY SYSTEM AND DISPLAY METHOD USING IMAGING APPARATUS AND PROJECTION VIDEO DISPLAY APPARATUS

CROSS-REFERENCE TO RELATED APPLICATION

This application is a Continuation of International Application No. PCT/JP2020/033108, filed on Sep. 1, 2020, which in turn claims the benefit of Japanese Application No. 2019-161110, filed on Sep. 4, 2019, the disclosures of which Application is incorporated by reference herein.

BACKGROUND

1. Field

The present invention relates to a display system and a display method using an imaging apparatus and a projection video display apparatus.

2. Description of the Related Art

In recent years, high-resolution video data of 4K/8K have increased. High-resolution video data has a large data volume. For transmission of high-resolution video data, therefore, the data volume is often compressed before transmission by performing an orthogonal transform process such as discrete cosine transform (DCT) and discrete wavelet transform (DWT).

A orthogonal transform process is a type of filtering process and so produces block noise or degradation degradation in modulation transfer function (MTF). Therefore, a video compressed by an orthogonal transform process will be degraded as compared with an uncompressed video.

One approach to address this will be to increase the resolution of a video taken, by taking a video by dividing the resolution in the temporal direction, subjecting the video to temporal integration by human visual perception when the video is displayed, and combining the video with the divided resolution.

For example, patent literature 1 teaches providing a pixel shifter in front of a video camera. The pixel shifter feeds an image of a subject to the video camera directly in the first frame period. In the second frame period, the pixel shifter feeds an image of the subject, with a shift of ½ pixel pitch in the vertical direction. The cathode ray tube (CRT) monitor displays the images obtained in the first and second frame periods with a shift of ½ pixel pitch.

[Patent Literature 1] JPH07-274070

In the scheme described above, the video is transferred in the interlace scheme. An odd-numbered field of frame 2 is scanned between an odd-numbered field of frame 1 and an even-numbered field of frame 1. An even-numbered field of frame 2 is scanned between an even-numbered field of frame 1 and an odd-numbered field of frame 1. Therefore, the resolution will be doubled, but the frame frequency will halved. Further, it is difficult to apply the scheme to display apparatuses other than those in which the scanning position can be changed as desired, such as CRT monitors.

SUMMARY

A display system according to an embodiment includes: an imaging apparatus that takes a video by shifting pixels in units of frames by moving a solid state image sensing device or an optical member physically; and a projection video display apparatus that acquires a video taken by the imaging apparatus, optically performs pixel shift corresponding to pixel shift performed in the imaging apparatus at the time of imaging, and projects the video acquired.

Another embodiment of the present invention relates to a display method. The method includes: taking a video by shifting pixels in units of frames by moving a solid state image sensing device or an optical member physically; and acquiring a video taken, optically performing pixel shift corresponding to pixel shift performed at the time of imaging, and projecting the video acquired to a projection surface.

Optional combinations of the aforementioned constituting elements, and implementations of the embodiment in the form of methods, apparatuses, and systems may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

Embodiment 1

Figure 1:
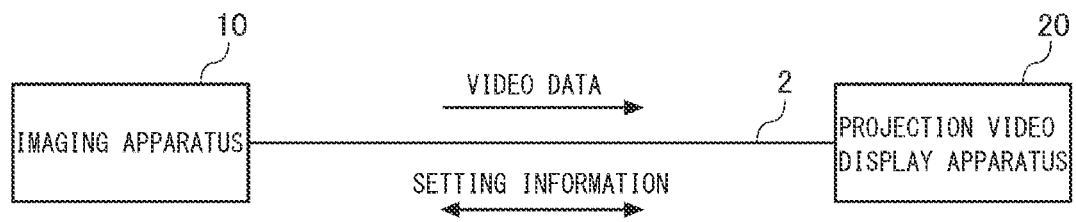
FIG. 1 shows an overall configuration of a display system according to embodiment 1 of the present invention.

FIG. 1 shows an overall configuration of a display system 1 according to embodiment 1 of the present invention. In embodiment 1, the display system 1 includes an imaging apparatus 10 and a projection video display apparatus 20. The imaging apparatus 10 and the projection video display apparatus 20 are connected via a network 2.

The network 2 is a generic term for a communication channel such as the Internet and a dedicated line. The embodiment is non-limiting as to the communication medium or the protocol. Cabled LAN, wireless LAN, cellular phone network, optical fiber network, ADSL network, CATV network, etc. can be used as the communication medium. Transmission control protocol (TCP)/Internet protocol (IP), user datagram protocol (UDP)/IP, secure reliable transport (SRT), etc. dan be used as the communication protocol.

The display system 1 according to this embodiment makes it possible to compress data, and, at the same time, display a high-resolution video, by taking and displaying a video by dividing the resolution in the temporal direction. The imaging apparatus 10 uses the pixel shift function to take a video by performing pixel shift in units of frames and transfers the video data thus taken to the projection video display apparatus 20. The projection video display apparatus 20 uses the pixel shift function to subject the video acquired from the imaging apparatus 10 to pixel shift synchronized with the pixel shift at the time of imaging and projects the video to a projection surface. This makes it possible to compress data transferred and, at the same time, display a high-resolution video. Specific details will be described below.

Figure 2:
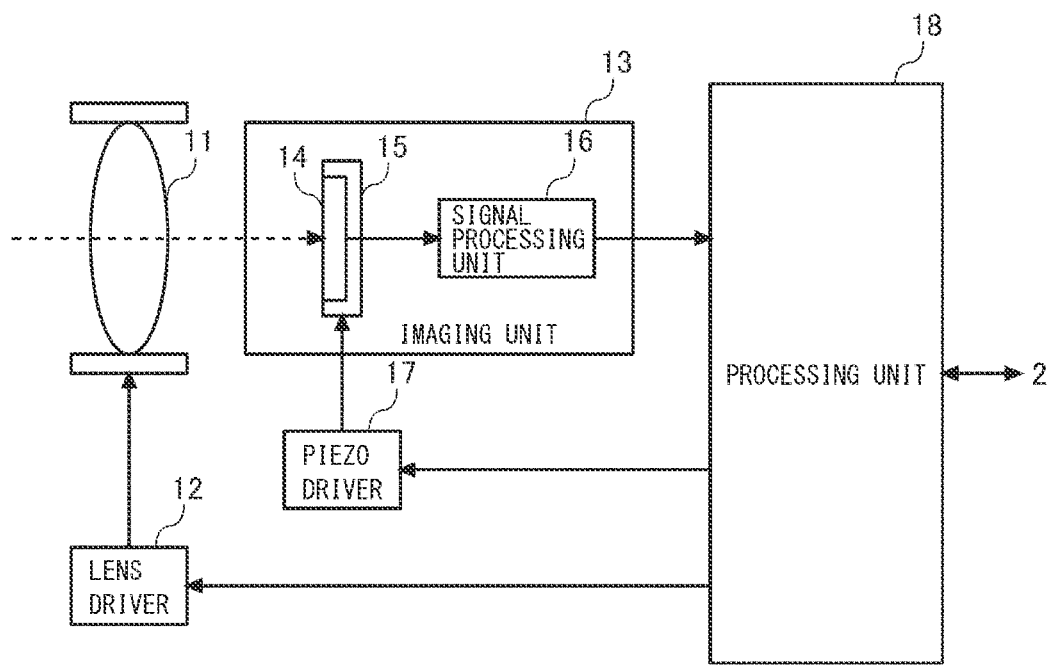
FIG. 2 shows an exemplary configuration of the imaging apparatus of FIG. 1.

FIG. 2 shows an exemplary configuration of the imaging apparatus 10 of FIG. 1. The imaging apparatus 10 includes a lens 11, a lens driver 12, an imaging unit 13, a piezo driver 17, and a processing unit 18. The imaging unit 13 includes a solid state image sensing device 14, a piezo stage 15, and a signal processing circuit 16.

For example, a Complementary metal oxide semiconductor (CMOS) image sensor or a charge coupled device (CCD) image sensor can be used as the solid state image sensing device 14. The solid state image sensing device 14 converts light incident via the lens 11 into an electrical signal and outputs the electrical signal to the signal processing circuit 16. The signal processing circuit 16 subjects an image signal input from the solid state image sensing device 14 to signal processing such as A/D conversion and noise elimination and outputs the processed signal to the processing unit 18.

The solid state image sensing device 14 is fixed to the piezo stage 15. Given that the light axis direction is the Z direction, the piezo stage 15 is a micromovement stage capable of moving the solid state image sensing device 14 in the X direction and the Y direction by a desired amount of shift. The piezo driver 17 moves the solid state image sensing device 14 in the X direction and the Y direction by amounts designated for the respective directions in accordance with a piezo driving signal supplied from the processing unit 18, thereby displacing the solid state image sensing device 14. This allows pixel shift at a 1/n pixel pitch. The processing unit 18 generates a piezo driving signal based on the pixel shift setting information described later.

The lens 11 is a focus lens that can move in the light axis direction. The lens driver 12 moves the lens 11 in the light axis direction in accordance with a lens driving signal supplied from the processing unit 18 to adjust the position of the lens 11. The processing unit 18 calculates the position of the lens 11 in the light axis direction based on a focus adjustment signal, etc. from, for example, an input means (not shown) to generate a lens driving signal.

In the example shown in FIG. 2, the pixel shift function is realized by physically moving the solid state image sensing device 14 by using the piezo stage 15. Alternatively, the pixel shift function may be realized by physically moving an optical member such as a lens (other than the focus lens) in the X direction and the Y direction by a piezo actuator, etc.

The processing unit 18 can be realized by cooperation of hardware resources and software resources or only by hardware resources. A CPU, ROM, RAM, image signal processor (ISP), graphics processing unit (GPU), digital signal processor (DSP), application specific integrated circuit (ASIC), field-programmable gate array (FPGA), and other LSIs can be used as hardware resources. Programs such as firmware can be used as software resources.

Figure 3:
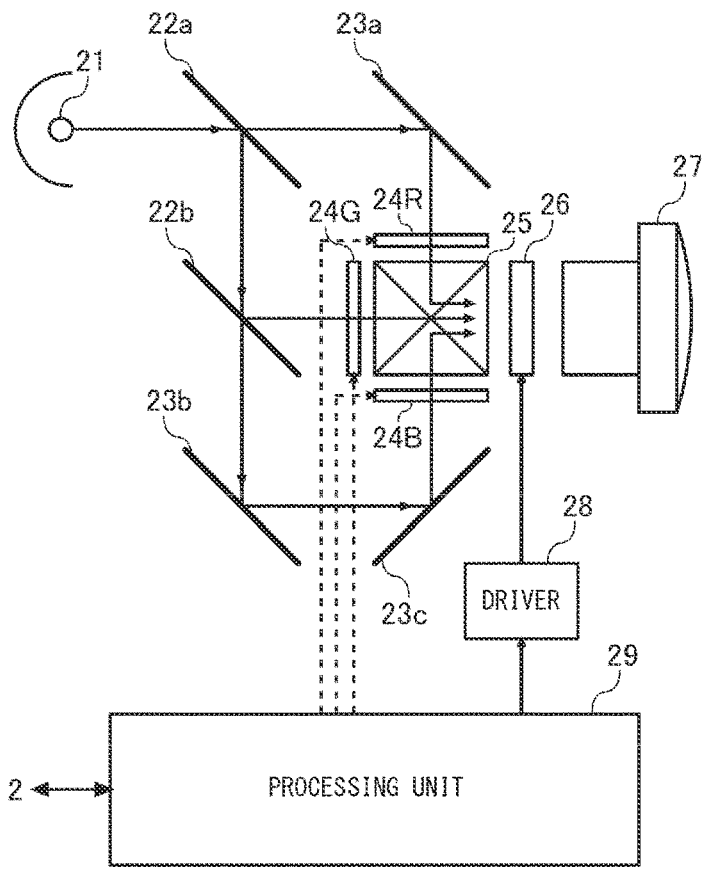
FIG. 3 shows an exemplary configuration of the projection video display apparatus of FIG. 1.

FIG. 3 shows an exemplary configuration of the projection video display apparatus 20 of FIG. 1. The projection video display apparatus 20 shown in FIG. 2 is a liquid crystal projector. The projection video display apparatus 20 includes a light source 21, dichroic mirrors 22a, 22b, reflecting mirrors 23a, 23b, 23c, a red liquid crystal panel 24R, a green liquid crystal panel 24G, a blue liquid crystal panel 24B, a synthesizing prism 25, a pixel shift device 26, a projection lens 27, a driver 28, and a processing unit 29.

A halogen lamp, xenon lamp, metal hydride lamp, extra high pressure mercury lamp, laser diode, etc. can be used as the light source 21.

The first dichroic mirror 22a separates the white light from the light source 21 into a red light and a cyan light. The second dichroic mirror 22b separates the cyan light into a green light and a blue light. The red light separated by the first dichroic mirror 22a is reflected by the reflecting mirror 23a and is incident on the red liquid crystal panel 24R. The green light separated by the second dichroic mirror 22b is incident on the green liquid crystal panel 24G. The blue light separated by the second dichroic mirror 22b is reflected by the reflecting mirrors 23b, 23c and is incident on the blue liquid crystal panel 24B.

The red liquid crystal panel 24R, the green liquid crystal panel 24G, and the blue liquid crystal panel 24B are transmission liquid crystal panels and produce a red video, a green video, and a blue video based on a video signal set by the processing unit 29. The synthesizing prism 25 produces a color video by synthesizing the red video, the green video, and the blue video.

The pixel shift device 26 is a glass plate provided with, for example, an actuator capable of tilting the glass plate in a desired direction. For example, a piezoelectric device elongated in response to a predetermined voltage applied may be used as the actuator. The driver 28 controls the tilting angle of the glass plate by driving the actuator in accordance with a pixel shift driving signal supplied from the processing unit 29. This causes the pixel shift device 26 to displace the light path of the incident light from the synthesizing prism 25. The processing unit 29 generates a pixel shift driving signal based on the pixel shift setting information described later. Inserting the pixel shift device 26 enables pixel shift at a 1/n pixel pitch. The projection lens 27 magnifies the light incident from the pixel shift device 26 and outputs the light to a projection surface such as a screen.

The configuration of the pixel shift device 26 is by way of example only. A polarizing device may be used to displace the light path optically instead of tilting the glass plate by the actuator. Alternatively, the projected video may be shifted by moving an optical device physically instead of displacing the light path optically.

The processing unit 29 can be realized by cooperation of hardware resources and software resources or only by hardware resources. A CPU, ROM, RAM, ISP, GPU, DSP, ASIC, FPGA, and other LSIs can be used as hardware resources. Programs such as firmware can be used as software resources.

Figure 4:
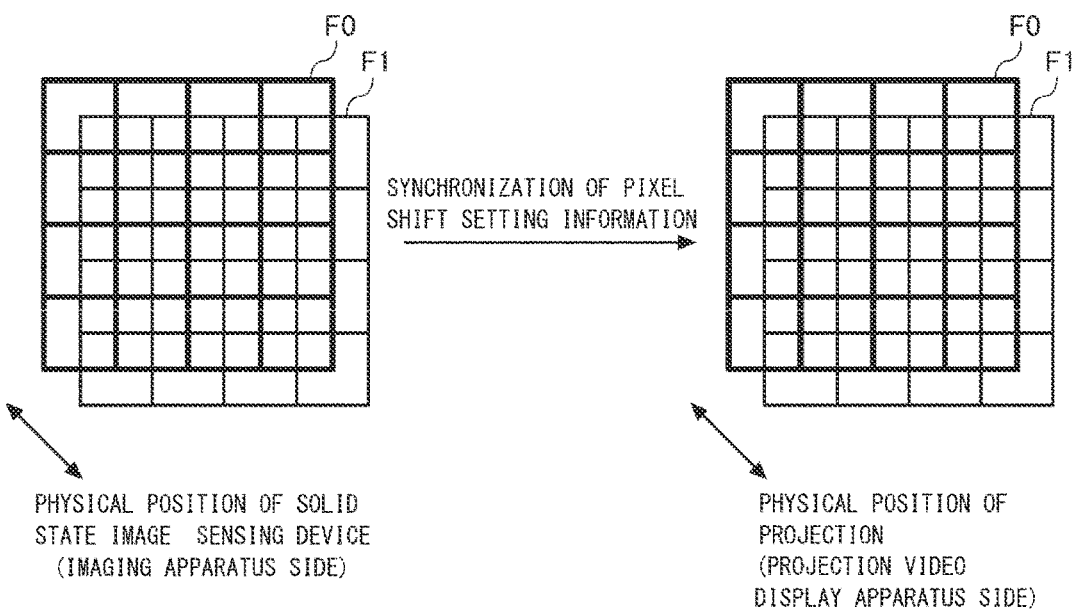
FIG. 4 shows an example of using the pixel shift function to double the apparent resolution of a frame image taken and displaying the resultant image.

FIG. 4 shows an example of using the pixel shift function to double the apparent resolution of a frame image taken and displaying the resultant image. The resolution here means a total resolution derived from multiplying the horizontal resolution and the vertical resolution. The pixel shift function shown in FIG. 4 multiplies the horizontal resolution by √2 apparently and multiplies the vertical resolution by √2 apparently. Accordingly, the total resolution will be doubled apparently. The imaging apparatus 10 takes a video by shifting, per frame, the solid state image sensing device 14 by ½ pixel (pixel shift) in a diagonal direction. More specifically, the imaging apparatus 10 alternately takes a video at the position of the 0-th frame F0 and the position of the 1st frame F1, which are shifted from each other by ½ pixel in the diagonal direction.

The projection video display apparatus 20 uses the pixel shift device 26 to project the video by inducing ½ pixel shift in the diagonal direction in each frame. This causes the physical position of projection from the projection video display apparatus 20 to be alternately switched between the position of the 0-th frame F0 and the position of the 1st frame F1, which are shifted from each other by ½ pixel in the diagonal direction.

It is required that the direction and amount of pixel shift, the number of pixel shift positions, the positions of the frames, and the frame rate be synchronized between the imaging apparatus 10 and the projection video display apparatus 20. In other words, the pixel shift setting information need be consistent between the imaging apparatus 10 and the projection video display apparatus 20. The pixel shift setting information in the example shown in FIG. 4 designates the direction of pixel shift of 45° diagonally downward right, the amount of pixel shift of ½ pixel pitch, the number of pixel shift positions is 2, the initial position is the position of an even-numbered frame, and the position of an odd-numbered frame is diagonally downward right with respect to the initial position, and the frame rate is 120 Hz.

In the case the imaging apparatus 10 and the projection video display apparatus 20 are products having functions for coordination, the pixel shift setting information is set in the ROM of the imaging apparatus 10 and the projection video display apparatus 20 in advance. In the case the imaging apparatus 10 and the projection video display apparatus 20 are products not having functions for coordination, the user inputs the pixel shift setting information to the imaging apparatus 10 and the projection video display apparatus 20, respectively. Alternatively, the pixel shift setting information is transmitted from the imaging apparatus 10 to the projection video display apparatus 20 via the network 2. For example, the pixel shift setting information may be embedded in the image data as meta data. Still alternatively, the pixel shift setting information may be appended to the user area of an IP packet when the video data is transferred in IP.

After establishing a communication channel with the processing unit 29 of the projection video display apparatus 20, the processing unit 18 of the imaging apparatus 10 transmits the pixel shift setting information to the processing unit 29. The processing unit 29 of the projection video display apparatus 20 generates a pixel shift driving signal designating the tilting angle for each pixel shift position and the timing of change of pixel shift position in the pixel shift device 26 based on the setting information received from the processing unit 18 of the imaging apparatus 10.

When the pixel shift setting information is embedded in the image data as meta data, the imaging apparatus 10 can transmit the setting information to the projection video display apparatus 20 for each image (frame). This ensures that the pixel shift setting information is synchronized properly in units of frames in the imaging apparatus 10 and the projection video display apparatus 20.

Figure 5A:
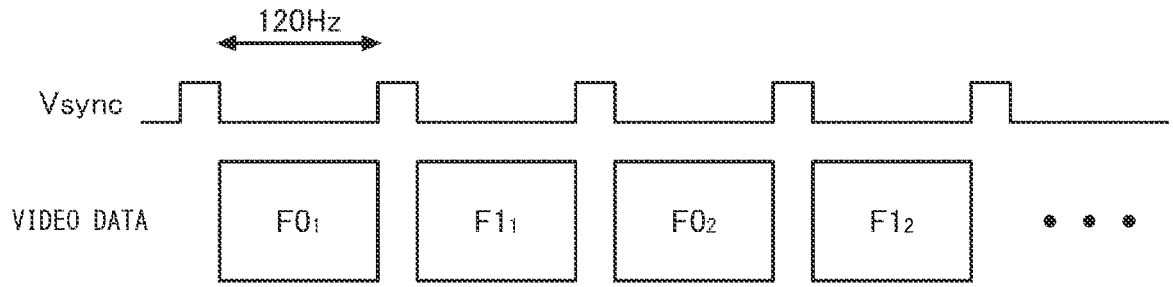
FIGS. 5A and 5B illustrate an exemplary method of transferring the video taken by the imaging apparatus shown in FIG. 4.
Figure 5B:
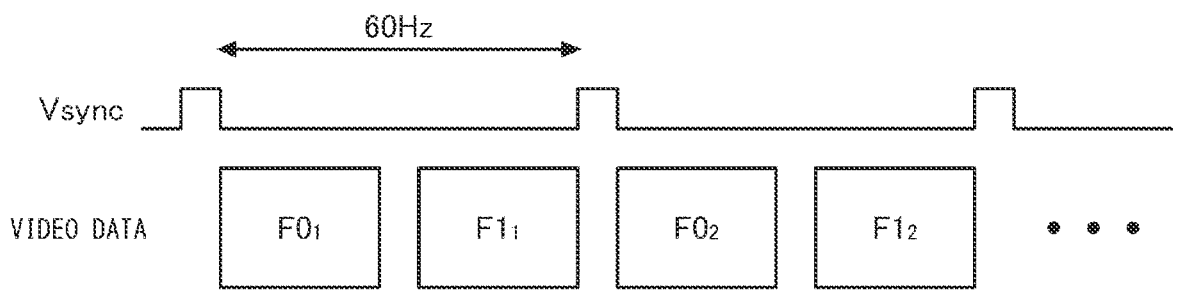

FIGS. 5A and 5B illustrate an exemplary method of transferring the video taken by the imaging apparatus 10 shown in FIG. 4. As shown in FIG. 5A, the processing unit 18 of the imaging apparatus 10 alternately acquires an image taken at the position of the 0th frame F0 and an image taken at the position of the 1st frame F1 at a period of 120 Hz from the imaging unit 13. For example, the processing unit 18 acquires an image F01 taken at the position of the 0th frame F0, an image F11 taken at the position of the 1st frame F1, an image F02 taken at the position of the 0th frame F0, and an image F12 taken at the position of the 1st frame F1. in the stated order.

The processing unit 18 of the imaging apparatus 10 sequentially transfers frame images in, for example, the frame packing scheme, which is one of the 3D formats. As shown in FIG. 5B, the processing unit 18 packs 2 frame images, including an image taken at the position of the 0th frame and an image taken at the position of the 1st frame F1 in a single vertical synchronization period. For example, the processing unit 18 packs the image F01 taken at the position of the 0th frame F0 and the image F11 taken at the position of the 1st frame F1 and packs the image F02 taken at the position of the 0th frame F0 and the image F12 taken at the position of the 1st frame F1. More specifically, the processing unit 18 changes the period of the vertical synchronization signal Vsync from 120 Hz to 60 Hz. The processing unit 18 transmits the video data including the frame images stored in the frame packing scheme to the projection video display apparatus 20 via the network 2.

The processing unit 29 of the projection video display apparatus 20 receives the video data transmitted from the imaging apparatus 10. The processing unit 29 extracts the frame images from the received video data based on the pixel shift setting information designated by the imaging apparatus 10. More specifically, the processing unit 29 changes the period of the vertical synchronization signal Vsync from 60 Hz to 120 Hz because the setting information designates that the number of pixel shift positions is 2. The processing unit 29 generates a pixel shift driving signal designating the tilting angle for each pixel shift position and the timing of change of pixel shift position in the pixel shift device 26.

The frame packing scheme described above is one example, and other formats may be used. For example, an image taken at the position of the 0th frame F0 and an image taken at the position of the 1st frame F1 may be transferred in the side-by-side scheme or the top-and-bottom scheme. In the case of the side-by-side scheme, an image taken at the position of the 0th frame F0 and an image taken at the position of the 1st frame F1 are arranged in the horizontal direction and turned into 1 frame image. In the case of the top-and-bottom scheme, an image taken at the position of the 0th frame F0 and an image taken at the position of the 1st frame F1 are arranged in the vertical direction and turned into 1 frame image. In these cases, however, a frame buffer for storing the frame image taken at the position of the 0th frame F0 temporarily is needed in the imaging apparatus 10 and the projection video display apparatus 20. In this respect, the frame packing scheme transfers frame images sequentially, and the projection video display apparatus 20 projects the images directly. It is therefore not necessary to provide the frame buffer in the imaging apparatus 10 and the projection video display apparatus 20.

In this embodiment, the usage of live transfer of the video taken by the imaging apparatus 10 to the projection video display apparatus 20 is primarily assumed. In that case, the imaging apparatus 10 basically transmits non-compressed video data. If the processing capability of the processing unit 18 of the imaging apparatus 10 and the processing unit 29 of the projection video display apparatus 20 is sufficient, the processing unit 18 of the imaging apparatus 10 may transmit video data in a predetermined format by subjecting the data to compression and coding, and the processing unit 29 of the projection video display apparatus 20 may use the video data received by subjecting the data to decompression and decoding.

Figure 6:
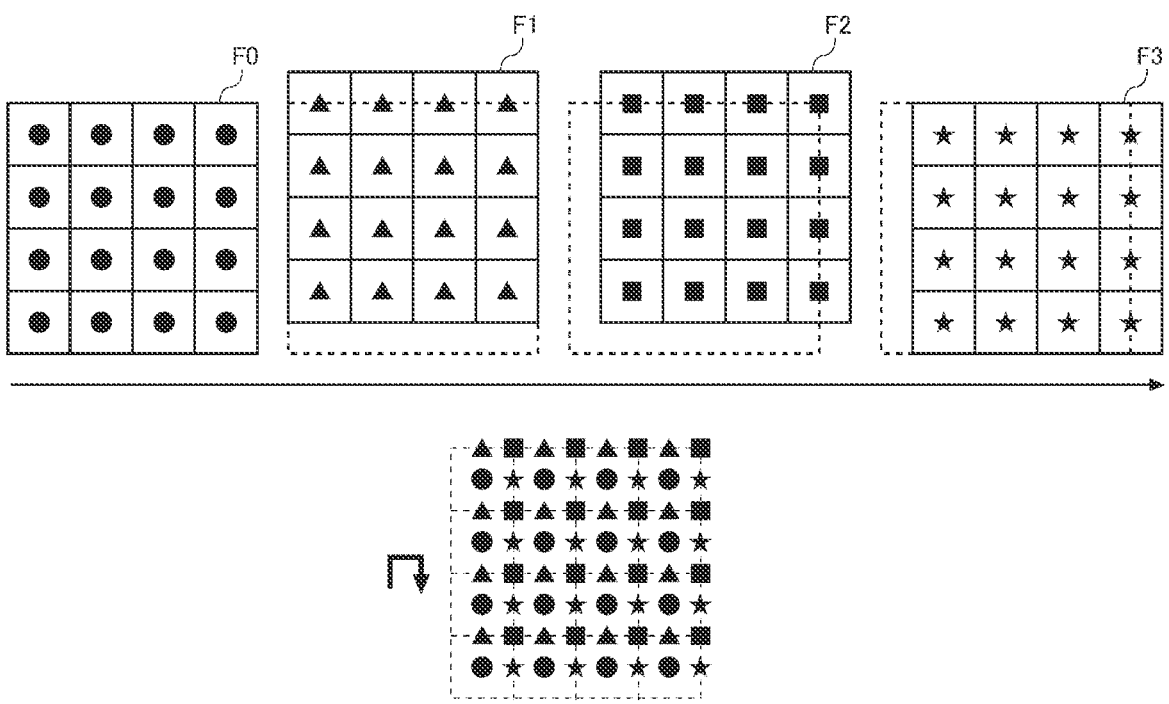
FIG. 6 shows an example of using the pixel shift function to quadruple the apparent resolution of a frame image taken and displaying the resultant image.

FIG. 6 shows an example of using the pixel shift function to quadruple the apparent resolution of a frame image taken and displaying the resultant image. The resolution here means a total resolution derived from multiplying the horizontal resolution and the vertical resolution. The pixel shift function shown in FIG. 6 doubles the horizontal resolution apparently, and doubles the vertical resolution apparently. Accordingly, the total resolution will be quadrupled apparently. According to this example, the image taken at the 4K resolution (3840×2160) can be displayed with the 8K resolution (7680×4320) apparently.

The imaging apparatus 10 takes a video by shifting the solid state image sensing device 14 by ½ pixel in the vertical direction, horizontal direction, and diagonal direction for each frame. More specifically, the imaging apparatus 10 takes a video at 4 positions including the position of the initial 0th frame F0, the position of the 1st frame F1 shifted from the initial position by ½ pixel in the upward direction, the position of the 2nd frame F2 shifted from the initial position by ½ pixel in the diagonally upward right direction, and the position of the 3rd frame F3 shifted from the initial position by ½ pixel in the right direction in the stated order.

The projection video display apparatus 20 uses the pixel shift device 26 to switching the position of projection of the frame image to the position of the initial 0th frame F0, the position of the 1st frame F1 shifted from the initial position by ½ pixel in the upward direction, the position of the 2nd frame F2 shifted from the initial position by ½ pixel in the diagonally upward right direction, and the position of the 3rd frame F3 shifted from the initial position by ½ pixel in the right direction in the stated order. In this way, the frame image is projected to 4 positions of projection sequentially from the projection lens 27. The sequence of switching between the 4 positions in imaging and projection described above is by way of example only. For example, the imaging apparatus 10 and the projection video display apparatus 20 may switch between the 4 positions in the counterclockwise or zigzag sequence.

The pixel shift setting information in the example shown in FIG. 6 designates that the directions of pixel shift are upward, 45° diagonally upward right, and rightward. The amount of pixel shift is ½ pixel pitch. The number of pixel shift positions is 4. Given that n is a natural number, the initial position is the position of the (4n-4)th frame, the position of the (4n-3)th frame is upward with respect to the initial position, the position of the (4n-2)th frame is 45° diagonally upward right with respect to the initial position, and the position of the (4n-1)th frame is rightward with respect to the initial position. The frame rate is 240 Hz.

Figure 7A:
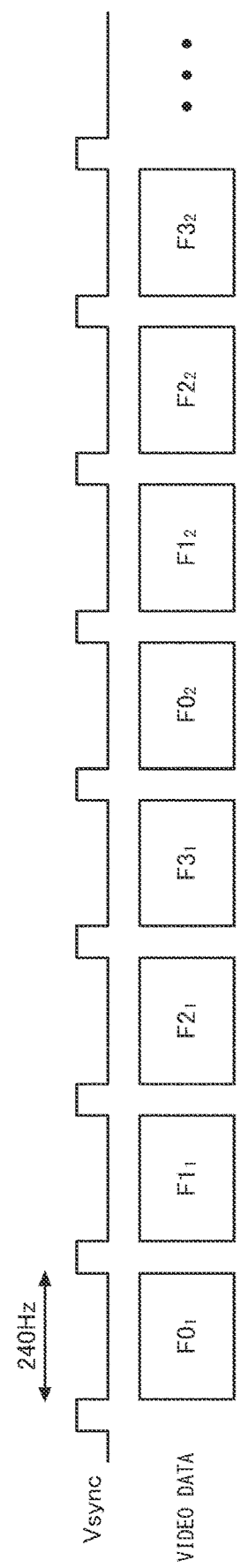
FIGS. 7A and 7B illustrate an exemplary method of transferring the video taken by the imaging apparatus shown in FIG. 6.
Figure 7B:
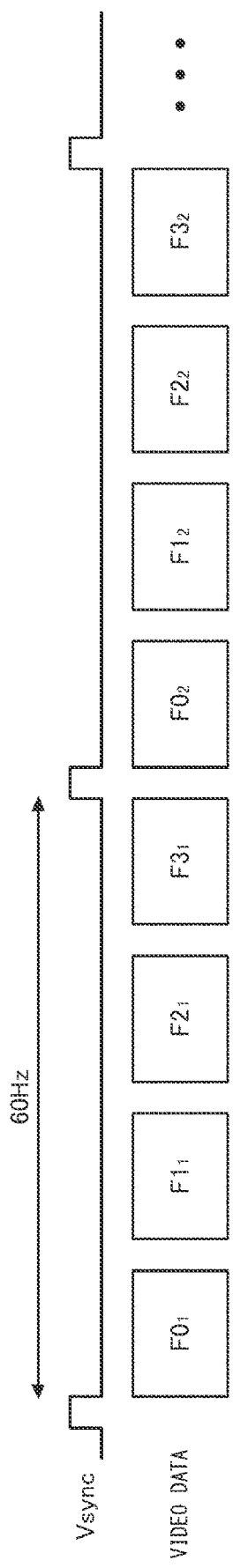

FIGS. 7A and 7B illustrate an exemplary method of transferring the video taken by the imaging apparatus 10 shown in FIG. 6. As shown in FIG. 7A, the processing unit 18 of the imaging apparatus 10 acquires an image taken at the position of the 0th frame F0, an image taken at the position of the 1st frame F1, an image taken at the position of the 2nd frame F2, and an image taken at the position of the 3rd frame F3 in the stated order, in a 240 Hz cycle from the imaging unit 13. For example, the processing unit 18 acquires an image F01 taken at the position of the 0th frame F0, an image F11 taken at the position of the 1st frame F1, an image F21 taken at the position of the 2nd frame F2, an image F31 taken at the position of the 3rd frame F3, an image F02 taken at the position of the 0th frame F0, an image F12 taken at the position of the 1st frame F1, an image F22 taken at the position of the 2nd frame F2, and an image F32 taken at the position of the 3rd frame F3 in the stated order.

The processing unit 18 of the imaging apparatus 10 sequentially transfers frame images in, for example, the frame packing scheme. As shown in FIG. 7B, the processing unit 18 packs 4 frame images, including an image taken at the position of the 0th frame, an image taken at the position of the 1st frame F1, an image taken at the position of the 2nd frame F2, and an image taken at the position of the 3rd frame F3 in a single vertical synchronization period. For example, the processing unit 18 packs the image F01 taken at the position of the 0th frame F0, the image F11 taken at the position of the 1st frame F1, the image F21 taken at the position of the 2nd frame F2, and the image F31 taken at the position of the 3rd frame F3, and packs the image F02 taken at the position of the 0th frame F0, the image F12 taken at the position of the 1st frame F1, the image F22 taken at the position of the 2nd frame F2, and the image F32 taken at the position of the 3rd frame F3. More specifically, the processing unit 18 changes the period of the vertical synchronization signal Vsync from 240 Hz to 60 Hz. The processing unit 18 transmits the video data including the frame images stored in the frame packing scheme to the projection video display apparatus 20 via the network 2.

The processing unit 29 of the projection video display apparatus 20 receives the video data transmitted from the imaging apparatus 10. The processing unit 29 extracts the frame images from the received video data based on the pixel shift setting information designated by the imaging apparatus 10. More specifically, the processing unit 29 changes the period of the vertical synchronization signal Vsync from 60 Hz to 240 Hz because the setting information designates that the number of pixel shift positions is 4. The processing unit 29 generates a pixel shift driving signal designating the tilting angle for each pixel shift position and the timing of change of pixel shift position in the pixel shift device 26.

Figure 8:
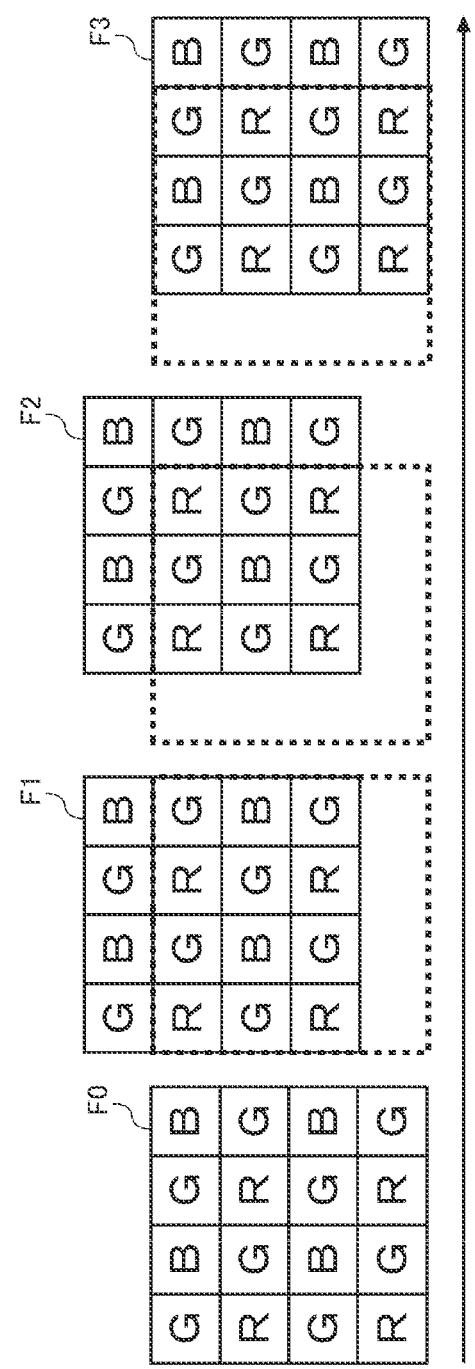
FIG. 8 shows another example of the pixel shift function in the imaging apparatus.

FIG. 8 shows another example of the pixel shift function in the imaging apparatus. It is assumed here that the solid state image sensing device 14 is provided with a color filter of a Bayer array. The imaging apparatus 10 takes a video by shifting the solid state image sensing device 14 by 1 pixel in the vertical direction, horizontal direction, and diagonal direction for each frame. More specifically, the imaging apparatus 10 takes a video at 4 positions including the position of the initial 0th frame F0, the position of the 1st frame F1 shifted from the initial position by 1 pixel in the upward direction, the position of the 2nd frame F2 shifted from the initial position by 1 pixel in the diagonally upward right direction, and the position of the 3rd frame F3 shifted from the initial position by 1 pixel in the right direction in the stated order.

The pixel shift setting information in the example shown in FIG. 8 designates that the directions of pixel shift are upward, 45° diagonally upward right, and rightward. The amount of pixel shift is 1 pixel pitch. The number of pixel shift positions is 4. Given that n is a natural number, the initial position is the position of the (4n-4)th frame, the position of the (4n-3)th frame is upward with respect to the initial position, the position of the (4n-2)th frame is 45° diagonally upward right with respect to the initial position, and the position of the (4n-1)th frame is rightward with respect to the initial position. The frame rate is 240 Hz.

Normally, when the imaging apparatus 10 sets the amount of pixel shift in 1 pixel pitch, the imaging apparatus 10 uses the pixel shift function for the purpose of making all of R information, G information, and B information available for each pixel of the solid state image sensing device 14. For example, the processing unit 18 of the imaging apparatus 10 produces 1 image by using 4 frames from the 0th frame F0 through the 3rd frame F3. According to this scheme, the processing unit 18 does not perform an interpolation process by a demosaic process described later so that the image quality is improved, but the number of pixels is not increased apparently. According to this embodiment, however, the number of pixels is increased apparently. Therefore, even when the processing unit 18 sets the amount of pixel shift in 1 pixel pitch, the processing unit 18 produces each frame as 1 image and transmits the image to the projection video display apparatus 20.

The processing unit 18 of the imaging apparatus 10 sequentially transfers frame images in, for example, the frame packing scheme. The processing unit 18 packs 4 frame images, including an image taken at the position of the 0th frame, an image taken at the position of the 1st frame F1, an image taken at the position of the 2nd frame F2, and an image taken at the position of the 3rd frame F3 in a single vertical synchronization period. More specifically, the processing unit 18 changes the period of the vertical synchronization signal Vsync from 240 Hz to 60 Hz. The processing unit 18 transmits the video data including the frame images stored in the frame packing scheme to the projection video display apparatus 20 via the network 2.

As described above, the amount of shift designated by the setting information transmitted from the processing unit 18 of the imaging apparatus 10 to the processing unit 29 of the projection video display apparatus 20 is 1 pixel pitch. However, even if the projection video display apparatus 20 displays a video by inducing a shift of 1 pixel in the vertical direction, horizontal direction, and diagonal direction, the projection video display apparatus 20 cannot increase the resolution apparently because the phase difference (amount of displacement) between pixels is null at each shift position. This may be addressed by allowing the processing unit 29 of the projection video display apparatus 20 to change the setting information to designate the amount of shift of ½ pixel in the vertical direction, horizontal direction, and diagonal direction and to generate a pixel shift driving signal designating the the tilting angle for each pixel shift position and the timing of change of pixel shift position in the pixel shift device 26. In other words, the processing unit 29 of the projection video display apparatus 20 may correct the amount of shift in the setting information.

As described above, embodiment 1 makes it possible to compress data transferred and, at the same time, to display a high-resolution video without using orthogonal transform, which is a scheme for irreversible compression, by taking an displaying a video by dividing the resolution in the temporal direction. When an orthogonal transform process is not used, the load for signal processing is reduced so that the delay is reduced. Further, high-frequency components are not eliminated so that the degradation in image quality is suppressed. It should be noted that, using an orthogonal transform process makes further data compression possible. It would be possible to transfer a video of the 8K resolution or higher by using an ordinary network 2.

By using the frame packing scheme to transfer video data, the process in the processing unit 18 of the imaging apparatus 10 and the process in the processing unit 29 of the projection video display apparatus 20 can be simplified. This can reduce the processing load on the processing unit 18 of the imaging apparatus 10 and the processing unit 29 of the projection video display apparatus 20.

By transmitting the pixel shift setting information from the imaging apparatus 10 the projection video display apparatus 20, synchronization for pixel shift between the imaging apparatus 10 and the projection video display apparatus 20 can be established simply and accurately. By allowing the projection video display apparatus 20 to correct the amount of pixel shift designated by the setting information, it is possible to display a high-resolution video regardless of the scheme for pixel shift in the imaging apparatus 10.

According to the features discussed above, the video taken by the imaging apparatus 10 can be projected live by the projection video display apparatus 20 with a small delay, without dropping frames, and at a high resolution.

Examples of displaying a video by doubling or quadrupling apparently the resolution of taken images is described above. The piezo stage 15 and the pixel shift device 26 can shift pixels at a pitch finer than ½ pixel. For example, pixel shift to 9 positions at a ⅓ pitch pitch is equally possible. In this case, the resolution can be multiplied by 9 apparently when the image taken is displayed, by setting the frame rate to be 9 times the original. Thus, embodiment 1 realizes high-resolution function having high flexibility and versatility.

Embodiment 2

Figures 9, 10A, 10B:
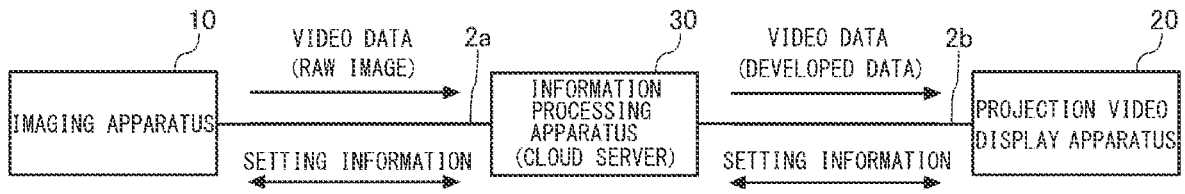
FIG. 9 shows an overall configuration of a display system according to embodiment 2 of the present invention.
FIGS. 10A and 10B show a RAW image of a Bayer array and an image subjected to a demosaic process, by way of example.

FIG. 9 shows an overall configuration of a display system 1 according to embodiment 2 of the present invention. In embodiment 2, the display system 1 includes an imaging apparatus 10, an information processing apparatus 30, and a projection video display apparatus 20. The imaging apparatus 10 and the information processing apparatus 30 are connected via a network 2a, and the information processing apparatus 30 and the projection video display apparatus 20 are connected via a network 2b.

The information processing apparatus 30 is comprised of, for example, a cloud server. The information processing apparatus 30 is provided with a processing unit and a storage unit. The processing unit of the information processing apparatus 30 can be realized by cooperation of hardware resources and software resources or only by hardware resources. A CPU, ROM, RAM, GPU, DSP, ASIC, FPGA, and other LSIs can be used as hardware resources. Programs such as operating systems and applications can be used as software resources. The storage unit of the information processing apparatus 30 includes a non-volatile large-capacity recording medium such as a hard disk drive (HDD) and a solid state drive (SSD).

In embodiment 2, the processing unit 18 of the imaging apparatus 10 transmits video data to the information processing apparatus 30. The information processing apparatus 30 receives the video data transmitted from the imaging apparatus 10 and transmits the received video data to the projection video display apparatus 20. In this case, the information processing apparatus 30 functions are a relay server for the video data. The information processing apparatus 30 can save the video data received from the imaging apparatus 10 in the storage unit as well as transferring it to the projection video display apparatus 20. In this case, the imaging apparatus 10 can transmit the video data to the projection video display apparatus 20 and save the video data in the information processing apparatus 30 at the same time.

When the solid state image sensing device 14 of the imaging apparatus 10 is a solid state image sensing device of a single-chip color, the image output from the solid state image sensing device 14 will be a RAW image, and it is necessary to perform a demosaic process in the processing unit 18 of the imaging unit 10. When the solid state image sensing device 14 is a solid state image sensing device provided with a color filter of a Bayer array, for example, the processing unit 18 of the imaging apparatus 10 is required to perform a demosaic process.

In embodiment 2, the processing unit 18 of the imaging apparatus 10 does not apply a demosaic process to the image data acquired from the imaging unit 13 and packs it according to the frame packing scheme, maintaining a RAW image format. The processing unit 18 transmits the video data including the RAW image to the information processing apparatus 30. The processing unit of the information processing apparatus 30 subjects the RAW image included in the video data received from the imaging apparatus 10 to a demosaic process to produce developed data. The processing unit of the information processing apparatus 30 transmits the video data including developed data to the projection video display apparatus 20.

FIGS. 10A and 10B show a RAW image of a Bayer array and an image subjected to a demosaic process, by way of example. Generally, the data for each pixel of a RAW image captured in RGB pixels is defined by 8 bits. Various algorithms for a demosaic process are available. It is general that color data missing in each pixel is produced by an interpolation process based on a plurality of adjacent pixels. In the case of a green pixel, for example, a demosaic process produces red data (8 bits) through an interpolation process based on a plurality of adjacent red pixels and produces blue data (8 bits) through an interpolation process based on a plurality of adjacent blue pixels. The demosaic process converts the data (8bits) for each pixel into color (RGB) data defined by 24 bits. The number of bits of the data for each pixel in a RAW image is not limited to 8. The data may be composed of 12 bits or 14 bits.

After subjecting the RAW image included in the video data received from the imaging apparatus 10 to a demosaic process, the processing unit of the information processing apparatus 30 may perform white balance adjustment. In this case, the processing unit 18 of the imaging apparatus 10 may transmit a setting value necessary for white balance adjustment, such as a color temperature, to the processing unit of the information processing apparatus 30. The processing unit of the information processing apparatus 30 may perform white balance adjustment based on the setting value such as a color temperature received from the imaging apparatus 10.

In embodiment 2, the demosaic process performed in the processing unit of the information processing apparatus 30 can convert the video data transferred from the imaging apparatus 10 to the information processing apparatus 30 from color (RGB) data in which each pixel is defined in 24 bits into data in which each pixel is defined by 8 bits. In other words, the volume of video data transferred from the imaging apparatus 10 to the information processing apparatus 30 can be compressed to ⅓. Generally, a larger bandwidth is assigned to the downlink than to the uplink in the Internet. The communication speed is higher downstream than upstream.

As described above, it is possible, according to embodiment 2, to compress the data volume in video transfer using the uplink by transmitting video data including a RAW image from the imaging apparatus 10 to the information processing apparatus 30. Accordingly, the delay in transfer from the imaging apparatus 10 to the information processing apparatus 30 can be suppressed. Further, the processing unit 18 of the imaging apparatus 10 does not perform a demosaic process so that the processing load on the processing unit 18 can be reduced, and the processing unit 18 mounted on a substrate can be simplified. This suppresses the size of the imaging apparatus 10 and makes it easy to mount the imaging apparatus 10 on a smartphone or a drone.

Given above is an explanation based on an exemplary embodiment. The embodiment is intended to be illustrative only and it will be understood by those skilled in the art that various modifications to combinations of constituting elements and processes are possible and that such modifications are also within the scope of the present invention.

In embodiments 1, 2, an example in which a projector of 3 liquid crystal display (LCD) system is used as the projection video display apparatus 20. A projector of digital light processing (DLP) system may be used, or a projector of liquid crystal on silicon system may be used so long as the function of shifting pixels optically by 1/n pixel pitch is mounted on the projector.

In embodiments 1, 2, an example in which the pixel shift setting information is transmitted from the imaging apparatus 10 to the projection video display apparatus 20 to designate the direction and amount of pixel shift from the side of the imaging apparatus 10. Alternatively, the setting information (phase information) including the direction and amount of pixel shift performed by the projection video display apparatus 20 may be transmitted from the projection video display apparatus 20 to the imaging apparatus 10. The processing unit 18 of the imaging apparatus 10 generates a piezo driving signal including the amount of movement and the timing of movement of the piezo stage 15 in the X direction and the Y direction, based on the setting information received from the processing unit 29 of the projection video display apparatus 20, and supplies the piezo driving signal to the piezo driver 17. In the case the piezo stage 15 uses a piezoelectric device capable of moving in the diagonal direction, the processing unit 18 of the imaging apparatus 10 sets the amount of movement and the timing of movement in the diagonal direction.

In embodiment 2, a description is given of an example in which the processing unit of the information processing apparatus 30 performs a demosaic process. Alternatively, the processing unit of the information processing apparatus 30 may transfer the video data including a RAW image received from the imaging apparatus 10 directly to the projection video display apparatus 20. The processing unit 29 of the projection video display apparatus 20 subjects the RAW image included in the video data received from the information processing apparatus 30 to a demosaic process to produce developed data. In embodiment 1, too, the imaging apparatus 10 may transmit video data including RAW image data to the projection video display apparatus 20, and the processing unit 29 of the projection video display apparatus 20 may subject the RAW image to a demosaic process to produce developed data.

What is claimed is:

1. A display system comprising:
   an imaging apparatus that takes a video by shifting pixels in units of frames by moving a solid state image sensing device or an optical member physically; and a projection video display apparatus that acquires a video taken by the imaging apparatus, optically performs pixel shift corresponding to pixel shift performed in the imaging apparatus at the time of imaging, and projects the video acquired, wherein the imaging apparatus transmits setting information to the projection video display apparatus, the setting information designating a direction and amount of pixel shift performed in the projection video display apparatus, and the projection video display apparatus performs pixel shift based on the setting information received.

2. The display system according to claim 1 wherein the projection video display apparatus corrects the amount of pixel shift designated by the setting information.

3. The display system according to claim 1, further comprising:

an information processing apparatus that receives the video data transmitted from the imaging apparatus and transmits the video data received to the projection video display apparatus.

4. The display system according to claim 3, wherein the solid state image sensing device is a solid state image sensing device of a single-chip color, the imaging apparatus transmits video data including a RAW image to the information processing apparatus, and the information processing apparatus transmits, to the projection video display apparatus, video data that includes developed data obtained by subjecting the RAW image included in the video data received to a demosaic process.

5. A display system comprising:

an imaging apparatus that takes a video by shifting pixels in units of frames by moving a solid state image sensing device or an optical member physically; and a projection video display apparatus that acquires a video taken by the imaging apparatus, optically performs pixel shift corresponding to pixel shift performed in the imaging apparatus at the time of imaging, and projects the video acquired, wherein the projection video display apparatus transmits setting information to the imaging apparatus, the setting information designating a direction and amount of pixel shift performed in the imaging apparatus, and the imaging apparatus performs pixel shift based on the setting information received.

6. The display system according to claim 5, further comprising:

an information processing apparatus that receives the video data transmitted from the imaging apparatus and transmits the video data received to the projection video display apparatus.

7. The display system according to claim 6, wherein the solid state image sensing device is a solid state image sensing device of a single-chip color, the imaging apparatus transmits video data including a RAW image to the information processing apparatus, and the information processing apparatus transmits, to the projection video display apparatus, video data that includes developed data obtained by subjecting the RAW image included in the video data received to a demosaic process.

8. A display method comprising:

taking a video by shifting pixels in units of frames by moving a solid state image sensing device or an optical member physically; and acquiring a video taken, optically performing pixel shift corresponding to pixel shift performed at the time of imaging, and projecting the video acquired to a projection surface, wherein the taking the video by the shifting pixels includes:

the solid state image sensing device or the optical member is shifted to n positions sequentially, wherein n is an integer equal to or greater than 2, and producing video data that include frame images taken at the n positions in one vertical synchronization period; and wherein the projecting the video includes projecting the n frame images included in the one vertical synchronization period to the n positions of projection sequentially.

9. The display method according to claim 8, wherein the taking the video by shifting pixels is performed by an imaging apparatus, and the projecting the video is performed by a projection video display apparatus, wherein the solid state image sensing device or the optical member is shifted to n positions sequentially while pixel shift is being performed in the imaging apparatus, wherein n is an integer equal to or greater than 2, the projection video display apparatus switches between n positions of projections sequentially while pixel shift is being performed in the projection video display apparatus, the imaging apparatus produces video data that include frame images taken at the n positions in one vertical synchronization period, and the projection video display apparatus projects the n frame images included in the one vertical synchronization period to the n positions of projection sequentially.

10. The display method according to claim 9, wherein the imaging apparatus transmits setting information to the projection video display apparatus, the setting information designating a direction and amount of pixel shift performed in the projection video display apparatus, and the projection video display apparatus performs pixel shift based on the setting information received.

11. The display method according to claim 10, wherein the projection video display apparatus corrects the amount of pixel shift designated by the setting information.

12. The display method according to claim 9, wherein the projection video display apparatus transmits setting information to the imaging apparatus, the setting information designating a direction and amount of pixel shift performed in the imaging apparatus, and the imaging apparatus performs pixel shift based on the setting information received.

* * * * *